No. 807,789. PATENTED DEC. 19, 1905.
Z. T. SWEENEY.
GUIDING DEVICE FOR MOTOR VEHICLES.
APPLICATION FILED JUNE 22, 1905.
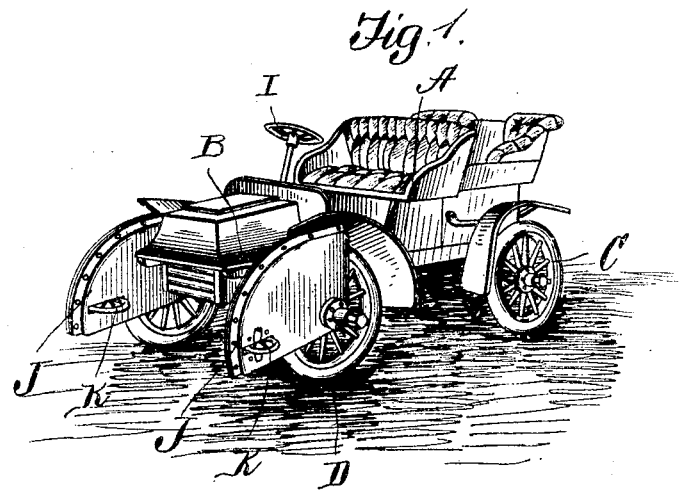
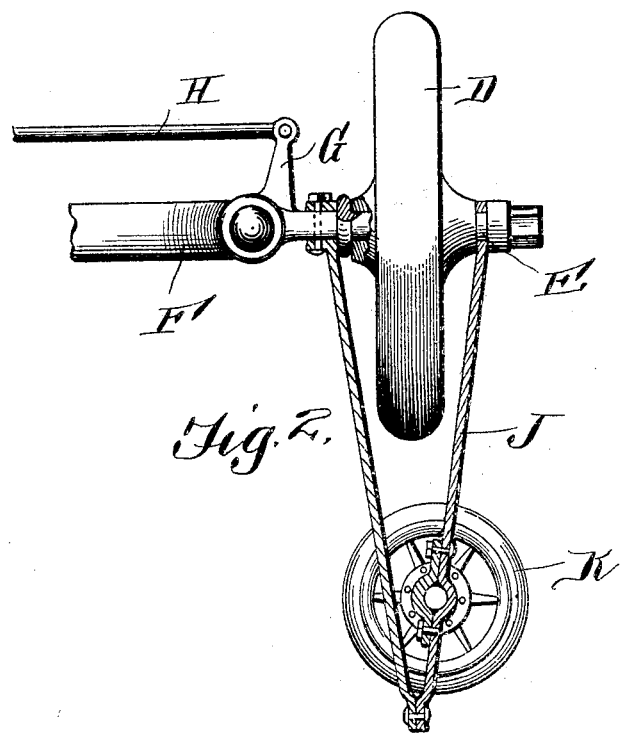
Witnesses
Robt A. Boswell
Wm. J. Whalley
Inventor
Zachary T. Sweeney
By Sturtevant & Curley
Attorneys

UNITED STATES PATENT OFFICE.

ZACHARY T. SWEENEY, OF COLUMBUS, INDIANA.

GUIDING DEVICE FOR MOTOR-VEHICLES.

No. 807,789.           Specification of Letters Patent.           Patented Dec. 19, 1905.

Application filed June 22, 1905. Serial No. 266,452.

*To all whom it may concern:*

Be it known that I, ZACHARY T. SWEENEY, a citizen of the United States, residing at Columbus, in the county of Bartholomew, State of Indiana, have invented certain new and useful Improvements in Guiding Devices for Motor-Vehicles, of which the following is a description, reference being had to the accompanying drawing and to the letters of reference marked thereon.

My invention relates to motor-vehicles, and has for its object to provide a guiding device adapted to act automatically to guide the vehicle away from an obstruction, and thus prevent injury to the vehicle or its passengers.

Serious accidents have happened to automobiles and other motor-vehicles from running into obstructions, which could have been easily avoided by a slight turn of the steering-wheel, and there is always more or less risk of injury to the wheels in bringing a motor-vehicle up to a sidewalk, particularly if the curbing is high, and to bring a motor-vehicle up to a sidewalk without bringing the wheels in contact with the curbing requires considerable skill on the part of the driver of the vehicle. By the use of my invention it is made impossible for the motor-vehicle to strike against an obstruction located in or at the side of the roadway, and it is also made impossible for the vehicle-wheels to come in contact with the curbing in bringing the vehicle up to the sidewalk.

My invention consists in the steering device for motor-vehicles hereinafter described and claimed.

In the drawing, A represents a motor-vehicle or automobile of usual construction driven by any convenient form of motor B, preferably arranged to drive the rear wheels C.

D represents the front or steering wheels, preferably carried on stub-axles E, pivoted to the ends of the front axle F and having arms G connected by rod H, which is adapted to be operated by the steering-gear I, which may be of any preferred construction.

Each of the steering-wheels D is provided with a hood J, carried by its stub-axle E and extending forward and downward to within a short distance of the plane of the roadway. At its forward end a guide-wheel K is journaled in the hood on a vertical axis, the wheel extending on both sides of the end of the hood, the wheel being preferably of a diameter greater than the width of the wheel-tire.

In the use of my device if an obstruction is met with the hood will, if the obstruction is a yielding or movable one, push it aside and prevent its coming in contact with the wheel, thus preventing the wheel from being damaged by obstructions which might tend to puncture the tire or bend or break the spokes. If the obstruction is an unyielding one, the wheel K will be engaged by it and the hood deflected to one side, turning the steering-wheels with it, and thus guiding the vehicle past the obstruction without injury. In bringing the motor-vehicle up to a sidewalk the wheel K will, as the wheels get near the sidewalk, be engaged by the curbing, causing the hood to be deflected, so that the vehicle-wheels may be brought up close to the curbing without danger of actually striking it.

My invention is particularly adapted for use in connection with motor-vehicles on roadways having a side or center guide-rail and is adapted to serve in connection with such guide-rail to automatically guide the vehicle without attention on the part of the driver.

It will of course be understood that the particular construction of the motor-vehicle forms no part of my present invention, my device being adapted to be used in connection with any motor-vehicle, whether it has two steering-wheels or one only.

The wheel K may, if desired, be dispensed with, the front end or nose of the hood being depended on to engage the obstruction.

Having thus described my invention, what I claim, and desire to secure by Letters Patent, is—

1. A guiding device for motor-vehicles comprising a hood carried by a steering-wheel of the vehicle and extending forward therefrom, adapted to contact with an obstruction and to deflect the steering-wheel to guide the vehicle past the obstruction.

2. A guiding device for motor-vehicles comprising a hood carried by a steering-wheel of the vehicle extending forward therefrom and carrying at its forward end, on a vertical axis, a wheel adapted to contact with an obstruction and to deflect the hood and with it the steering-wheel, to guide the vehicle past the obstruction.

3. A guiding device for motor-vehicles comprising a hood carried by a steering-wheel of the vehicle extending forward therefrom and carrying at its forward end, on a vertical axis, a wheel of a diameter greater than the width of the steering-wheel tire.

In testimony whereof I affix my signature in presence of two witnesses.

ZACHARY T. SWEENEY.

Witnesses:
CARRIE E. DE BOOS,
MAE SWEENEY.